(12) United States Patent
Jonas

(10) Patent No.: US 11,023,476 B2
(45) Date of Patent: *Jun. 1, 2021

(54) TESTING PAIRINGS TO DETERMINE WHETHER THEY ARE PUBLICALLY KNOWN

(71) Applicant: International Business Machines Corporation, Armonk, NY (US)

(72) Inventor: Jeffrey J. Jonas, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 31 days.

This patent is subject to a terminal disclaimer.

(21) Appl. No.: 15/848,800

(22) Filed: Dec. 20, 2017

(65) Prior Publication Data

US 2018/0113942 A1  Apr. 26, 2018

Related U.S. Application Data

(63) Continuation of application No. 15/217,853, filed on Jul. 22, 2016.

(51) Int. Cl.
 *G06F 17/00* (2019.01)
 *G06F 16/2458* (2019.01)
(52) U.S. Cl.
 CPC ............... *G06F 16/2468* (2019.01)
(58) Field of Classification Search
 CPC .................................................. G06F 16/2468
 See application file for complete search history.

(56) References Cited

U.S. PATENT DOCUMENTS

| | | | |
|---|---|---|---|
| 6,182,091 B1 | 1/2001 | Pitkow et al. | |
| 6,640,229 B1 * | 10/2003 | Gilmour | G06F 16/30 707/784 |
| 7,783,604 B1 * | 8/2010 | Yueh | G06F 11/1453 707/640 |
| 8,620,927 B2 | 12/2013 | Jonas | |
| 8,645,391 B1 | 2/2014 | Wong et al. | |
| 8,812,435 B1 | 8/2014 | Zhao | |
| 2001/0013035 A1 * | 8/2001 | Cohen | G06F 16/256 |
| 2004/0093347 A1 | 5/2004 | Dada | |
| 2004/0205080 A1 | 10/2004 | Patel | |

(Continued)

FOREIGN PATENT DOCUMENTS

| | | |
|---|---|---|
| EP | 1959362 A1 | 8/2008 |
| WO | WO03058503 A1 | 7/2003 |
| WO | WO2014078424 A1 | 5/2014 |

OTHER PUBLICATIONS

Christen, P., "A Survey of Indexing Techniques for Scalable Record Linkage and Deduplication", IEEE Transactions on Knowledge and Data Engineering, vol. 24, No. 9, Sep. 2012, Total 19 pp.

(Continued)

*Primary Examiner* — Greta L Robinson
(74) *Attorney, Agent, or Firm* — Konrad Raynes Davda & Victor LLP; Janaki K. Davda

(57) ABSTRACT

Provided are techniques for testing pairings to determine whether they are publically known. It is determined whether a pairing from a record is publicly known by searching public data stores. The pairing is marked with an outcome of the determining. An operation is performed on the pairing based on the outcome.

7 Claims, 6 Drawing Sheets

(56) References Cited

U.S. PATENT DOCUMENTS

| | | |
|---|---|---|
| 2008/0222092 A1 | 9/2008 | Hueske et al. |
| 2009/0282012 A1 | 11/2009 | Konig et al. |
| 2010/0088305 A1 | 4/2010 | Fournier |
| 2010/0199169 A1 | 8/2010 | Gnech et al. |
| 2011/0208763 A1* | 8/2011 | McSherry ............ G06F 21/6245 707/757 |
| 2012/0179682 A1 | 7/2012 | De Saeger et al. |
| 2013/0110802 A1 | 5/2013 | Shenoy et al. |
| 2013/0124474 A1* | 5/2013 | Anderson ............. G06F 16/285 707/634 |
| 2013/0204880 A1 | 8/2013 | Lesiecki et al. |
| 2014/0093347 A1 | 4/2014 | Thomas et al. |
| 2014/0143137 A1 | 5/2014 | Carlson |
| 2014/0280285 A1 | 9/2014 | Quinion et al. |
| 2014/0297570 A1* | 10/2014 | Garera ................ G06Q 10/101 706/12 |
| 2014/0379736 A1 | 12/2014 | Ionescu et al. |
| 2015/0127649 A1 | 5/2015 | Felch |
| 2016/0103885 A1 | 4/2016 | Lee et al. |
| 2017/0230387 A1* | 8/2017 | Srinivasan .............. G06F 16/35 |

OTHER PUBLICATIONS

Rafeeque et al., "Text Mining for Finding Acronym-Definition Pairs from Biomedical Text Using Pattern Matching Method with Space Reduction Heuristics", 15th International Conference on Advanced Computing and Communications, © 2007, IEEE, Total 6 pp.

Su et al., "Record Matching over Query Results from Multiple Web Databases", IEEE Transactions on Knowledge and Data Engineering, vol. 22, No. 4, Apr. 2010, Total 12 pp.

Office Action 1 for U.S. Appl. No. 15/217,853, pp. 20, dated May 15, 2018.

Response to Office Action 1 for U.S. Appl. No. 15/217,853, pp. 12, dated Aug. 15, 2018.

Dallal, G.E., "Paired Data/Paired Analyses", [online], [Retrieved on Sep. 24, 2015]. Retrieved from the Internet at <URL: http://www.tufts.edu/~gdallal/paired.htm>, © 2000, last modified: Mar. 19, 2007, Total 6 pp.

Dinov, I., "Introduction to Statistical Methods for the Life and Health Sciences", University of California, Los Angeles, Fall 2005. Retrieved from the Internet at <URL: http://www.stat.ucla.edu/~dinov/courses_students.html>, Total 7 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Stubblebine, S.G. and C.A. Meadows, "On Searching for Known and Chosen Cipher Pairs Using the NRL Protocol Analyzer", DIMACS Workshop on Design and Formal Verification of Security Protocols, Sep. 1997, Total 14 pp.

List of IBM Patents or Patent Applications Treated as Related, Dec. 20, 2017, Total 2 pp.

Preliminary Amendment, Dec. 20, 2017, for U.S. Appl. No. 15/217,853, filed Jul. 22, 2016 by J.J. Jonas, Total 5 pp.

U.S. Appl. No. 15/217,853, filed Jul. 22, 2016, entitled "Testing Pairings to Determine Whether They Are Publically Known", invented by J.J. Jonas, Total 28 pp.

Office Action 3, dated Feb. 11, 2019, for U.S. Appl. No. 15/217,853, 11 pp.

Response to Office Action 3, dated May 9, 2019, for U.S. Appl. No. 15/217,853, 9 pp.

Final Office Action for U.S. Appl. No. 15/217,853, pp. 10, dated Oct. 15, 2018.

Response to Final Office Action for U.S. Appl. No. 15/217,853, pp. 7, dated Jan. 14, 2009.

Final Office Action 2 for U.S. Appl. No. 15/217,853, 13 pp., dated Jul. 5, 2019.

Response to Final Office Action 2 for U.S. Appl. No. 15/217,853, 10 pp., dated Oct. 7, 2019.

Office Action 5 for U.S. Appl. No. 15/217,853, 13 pp., dated Oct. 30, 2019.

Response to Office Action 5 for U.S. Appl. No. 15/217,853, 11 pp., dated Jan. 29, 2020.

Final Office Action 3 for U.S. Appl. No. 15/217,853, 15 pp., dated Mar. 18, 2020.

Response to Final Office Action 3 for U.S. Appl. No. 15/217,853, 11 pp., dated Jun. 18, 2020.

Office Action 7 for U.S. Appl. No. 15/217,853, 10 pp., dated Aug. 19, 2020.

Response to Office Action 7 for U.S. Appl. No. 15/217,853, 10 pp., dated Nov. 18, 2020.

Notice of Allowance 1 for U.S. Appl. No. 15/217,853, 12 pp., dated Jan. 25, 2021.

* cited by examiner

US 11,023,476 B2

1

TESTING PAIRINGS TO DETERMINE WHETHER THEY ARE PUBLICALLY KNOWN

FIELD

Embodiments of the invention relate to testing pairings to determine whether they are publically known.

BACKGROUND

A Non-Disclosure Agreement (NDA) may be described as an agreement not to disclose material (e.g., ideas, documents, etc.) identified in the NDA. An NDA may state that the material is to be kept confidential "if not already publically known." Thus, when presented with some NDA protected material, it may be difficult to determine which, if any, of this material is publically known.

SUMMARY

Provided is a method for testing pairings to determine whether certain data are publically known. The method comprises: determining whether a pairing from a record is publicly known by searching public data stores, marking the pairing with an outcome of the determining and performing an operation on the pairing based on the outcome.

Provided is a computer program product for testing pairings to determine whether certain data are publically known. The computer program product comprises a computer readable storage medium having program code embodied therewith, the program code executable by at least one processor to perform: determining whether a pairing from a record is publicly known by searching public data stores, marking the pairing with an outcome of the determining and performing an operation on the pairing based on the outcome.

Provided is a computer system for testing pairings to determine whether certain data are publically known. The computer system comprises one or more processors, one or more computer-readable memories and one or more computer-readable, tangible storage devices and program instructions, stored on at least one of the one or more computer-readable, tangible storage devices for execution by at least one of the one or more processors via at least one of the one or more memories, to perform: determining whether a pairing from a record is publicly known by searching public data stores, marking the pairing with an outcome of the determining and performing an operation on the pairing based on the outcome.

BRIEF DESCRIPTION OF THE SEVERAL VIEWS OF THE DRAWINGS

Referring now to the drawings in which like reference numbers represent corresponding parts throughout.

2

Figure 6:
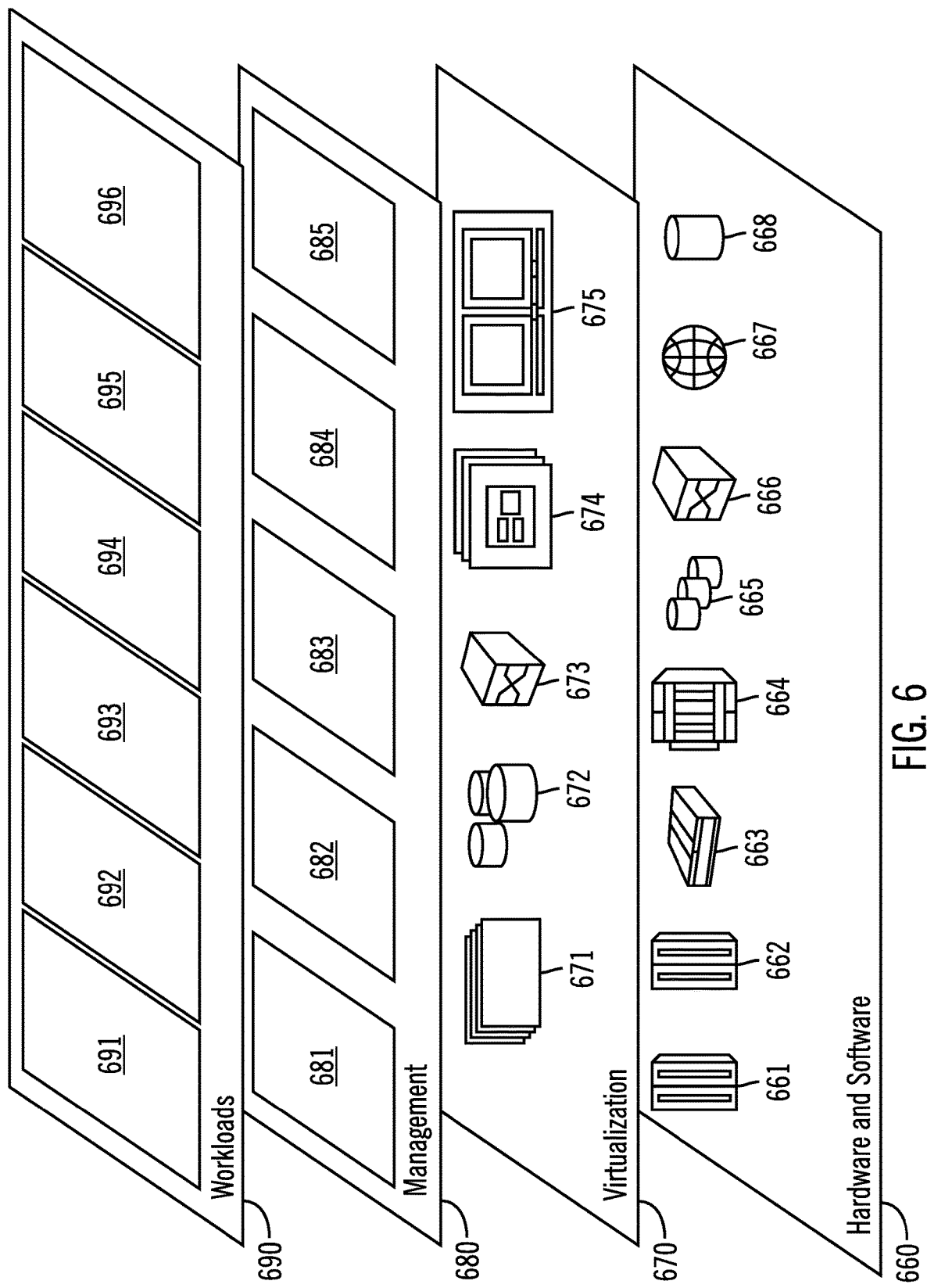

FIG. 6 illustrates abstraction model layers in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
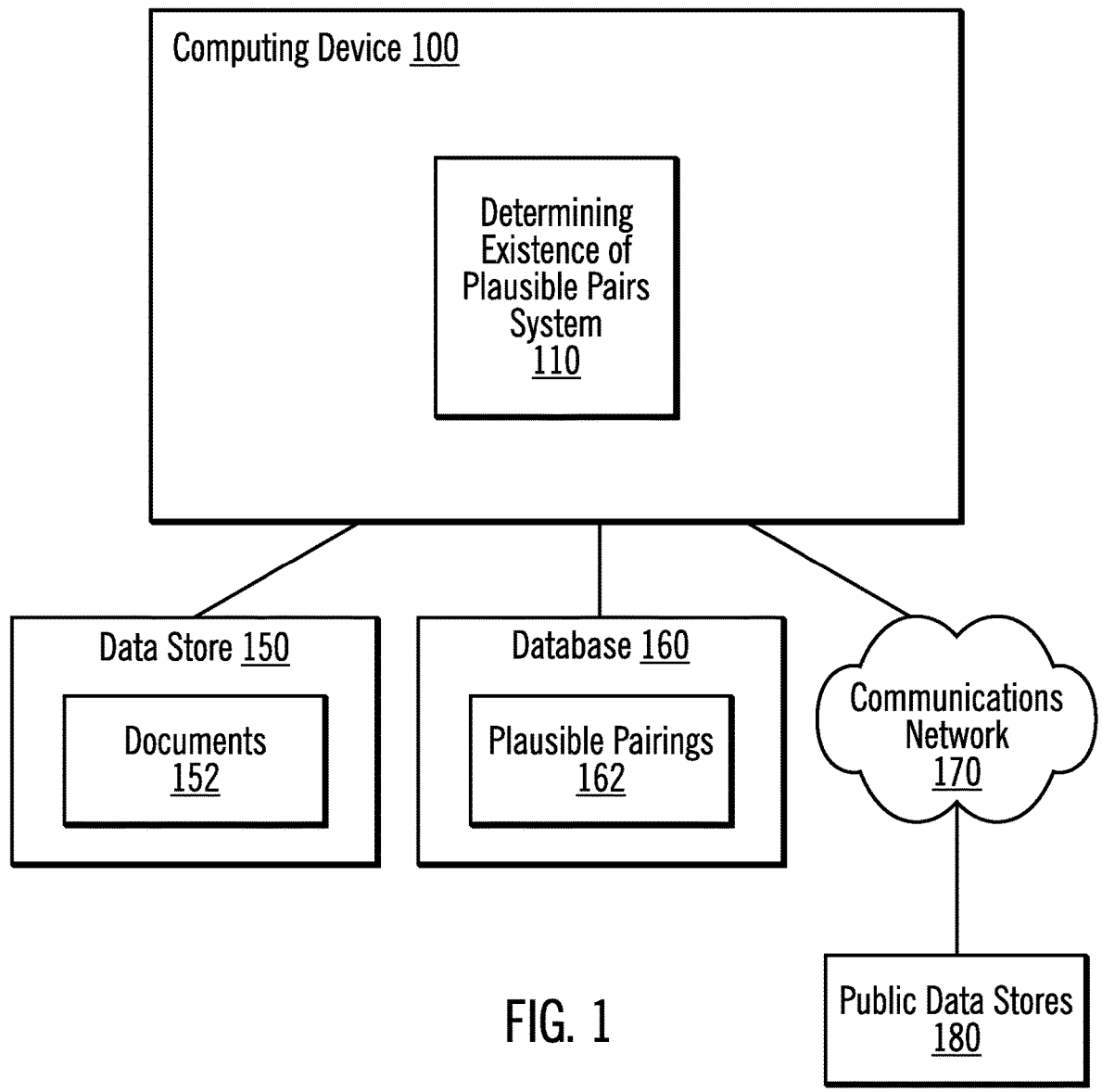
FIG. 1 illustrates, in a block diagram, a computing environment in accordance with certain embodiments.

FIG. 1 illustrates, in a block diagram, a computing environment in accordance with certain embodiments. In FIG. 1, a computing device 100 is coupled to a data store 150 and to a database 160. The computing device 100 includes a Determining Existence of Plausible Pairings (DEPP) system 110. The data store 150 stores documents 152. With embodiments, the documents 152 may be structured, unstructured, database records, multi-media, pictures, virtual/augmented/mixed reality renderings, etc. The database 160 stores plausible pairings 162 as records in a table of the database 160.

In certain embodiments, plausible pairings 162 are groups of fields that are relevant for determining whether the pairing is publically known, and only plausible pairings 162 are stored. With embodiments, plausible pairings depend on context. For example, in certain contexts, a pairing of a name and an address may be a plausible pairing, while a pairing of a date and a page number would not be a plausible pairing. In certain embodiments, the data store 150 is a database.

For example, data pairs of words may be found in the same data source that are not directly related to each other. For example, imagine this list of names and phone numbers:

Mark, 702.345.7898
Sue, 310.568.1265
Frank, 415.873.0192

A search for the pair "Mark", "415.873.0192" would find a document having both the name "Mark" and the phone number "415.873.0192". But because these are not correlated to each other in this example, the pair "Mark", "415.873.0192" is not a plausible pair, whereas the pair "Mark", "702.345.7898" is a plausible pair.

With embodiments, plausible pairs may include 1) related entity features (e.g., names and their corresponding date of birthdays, phone numbers, addresses, etc.); and 2) related entities (e.g., A "met with" B; A "lives with" B; A "sued" B; A "employs" B, etc.).

In various embodiments, the records are one of structured and unstructured. In certain embodiments, the structured records include traditional records in a database (e.g., a contacts database containing names and email addresses).

The computing device 100 is coupled to public data stores 180 via a communications network 170 (e.g., the Internet, an intranet, etc.).

With embodiments, the DEPP system 110 parses the documents 152 (e.g., NDA protected material) into pairings 170. For example, a product version and a future release date may be found to be a pairing. Then, the DEPP system 110 uses this pairing to determine whether this pairing is publically known by checking available public knowledge in public data stores 180 (e.g., Internet search, an intranet search, a combination of these searches, etc.).

Also, if the document contained a product version and future release date that was claimed to be confidential, the DEPP system 110 tests this claim against generally available public knowledge in public data stores 180 (e.g., Internet search, an intranet search, a data aggregator search, a combination of these searches, etc.).

While the DEPP system 110 may be applied to NDA protected material, the DEPP system 110 may also be applied to any other data. For example, if a data holder transfers data to a third party service provider for data enhancement and analytics, it is customary that the third party service provider protect the provided data, ensuring this data is not transferred, repurposed, resold, etc. The DEPP system 110 may be used to bifurcate the provided data into pairings that are generally available public knowledge. For each discovery of such public knowledge pairings, the third party could reasonably be expected to retain this discovery as it is publically known. Even in the event the data provider calls for the destruction of the data, in some situations (e.g., certain contractual settings), the third party service provider may be able to retain the publically available data, which the DEPP system 110 discovered to be public data.

Data discovered by the DEPP system 110 may lead to more clear lines between proprietary data and generally available public data. With this, data users (whether this be the original data holder or the third party service provider) will have a better understanding of data confidentiality, and with this both are able to benefit from greater freedom of action.

With embodiments, the DEPP system 110 also discovers emerging novelty. Imagine one comes upon a pairing that either does not yet exist in the public domain or that exists only once.

With embodiments, the third party service provider may decide to never even look for the public availability of pairings, unless a certain threshold has been met which could include an elapsed time (e.g., after 1 year), a number of distinct occurrences seen (e.g., only if the pairing has been seen across >3 different data holders or documents).

The following are examples of plausible pairings:
Name and Address
Name and Phone
Address and geolocation
Name and company affiliation with job title
Company's name and Board members
Company's name and parent company's name
Name and accusation (e.g., Bill Smith indicted)
Bank account number and balance (e.g., published public record following criminal court case)
Name and owner of particular brand of clothing, shoes, etc. (e.g., a famous person wearing a particular designer's clothing or shoe line)
Parent's name and child's name
Husband's name and wife's name
Name and type of car owned
Email and cell phone number In certain embodiments, the plausible pairings are stored in database records in a database.

The DEPP system 110 detects novelty in pairings separating confidential information from already publically known information. This may include proprietary information, trade secrets, obscure facts, limited visibility knowledge, etc. With embodiments, plausible pairings may include categories beyond traditional confidential information (e.g., documents marked "confidential" or "top secret").

Figure 2:
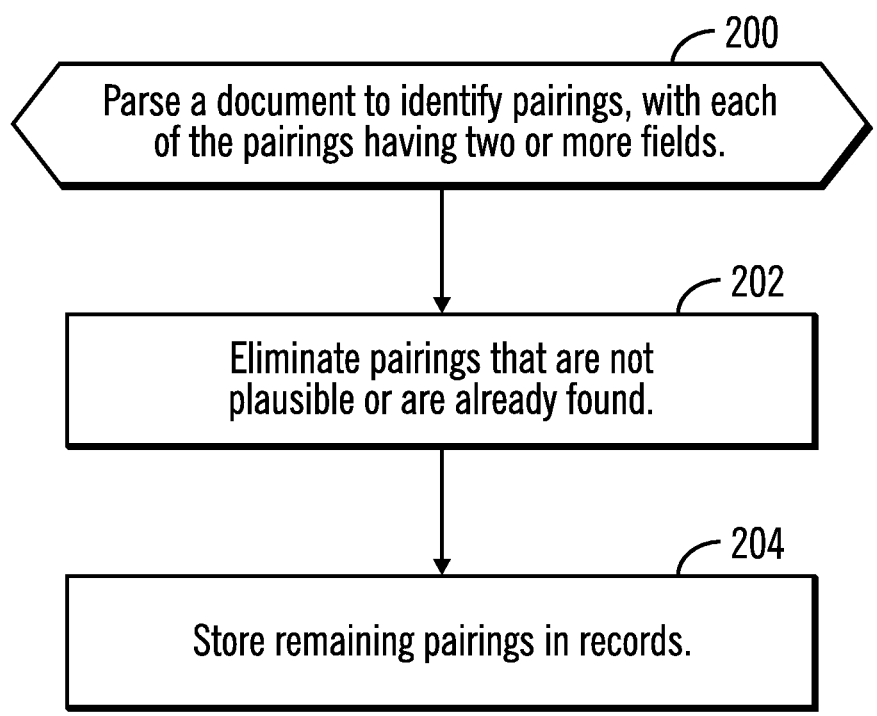
FIG. 2 illustrates, in a flow chart, processing for generating pairings in accordance with certain embodiments.

FIG. 2 illustrates, in a flow chart, processing for generating pairings in accordance with certain embodiments. Control begins at block 200 with the DEPP system 110 parsing a document to identify pairings, with each of the pairings having two or more fields. In certain embodiments, a word alone is a secret. For example, a single word name of a classified government program may be a secret. Also, the single word name of a secret code word program (e.g., "Phantex9") may be a secret. To handle this, embodiments have a pairing of two fields: (<secret word>, [exists]) (e.g., ("Phantex9", [exists]).

In block 202, the DEPP system 110 eliminates pairings that are not plausible or are already found. In certain embodiments, any combination of an entity's identifiers (name, address, phone, passport, etc.) may be plausible pairs, thus excluding pairs that span entity types (e.g., excluding "full name" (of entity type person) and "year of manufacturing" (of entity type car)). Users may override defaults with fields to always check and fields to ignore. Machine learning may also be used to discover reasonable pairing combinations (e.g., person name and favorite band—considering all non-reasonable pairs, unreasonable.

In block 204, the DEPP system 110 stores the remaining pairings as records. For example, a pairing of name/address/social security number may be one record, while a pairing of name/address/passport number may be another record. Thus, with embodiments, only the plausible pairings are stored for further processing. In certain embodiments, each of the records in the database includes the recording of: data store (i.e., data source), attribution (i.e., where the pair was originally found (e.g., document 123 owned by company ABC)), and data and time on the original document, and other meta data.

Figure 3:
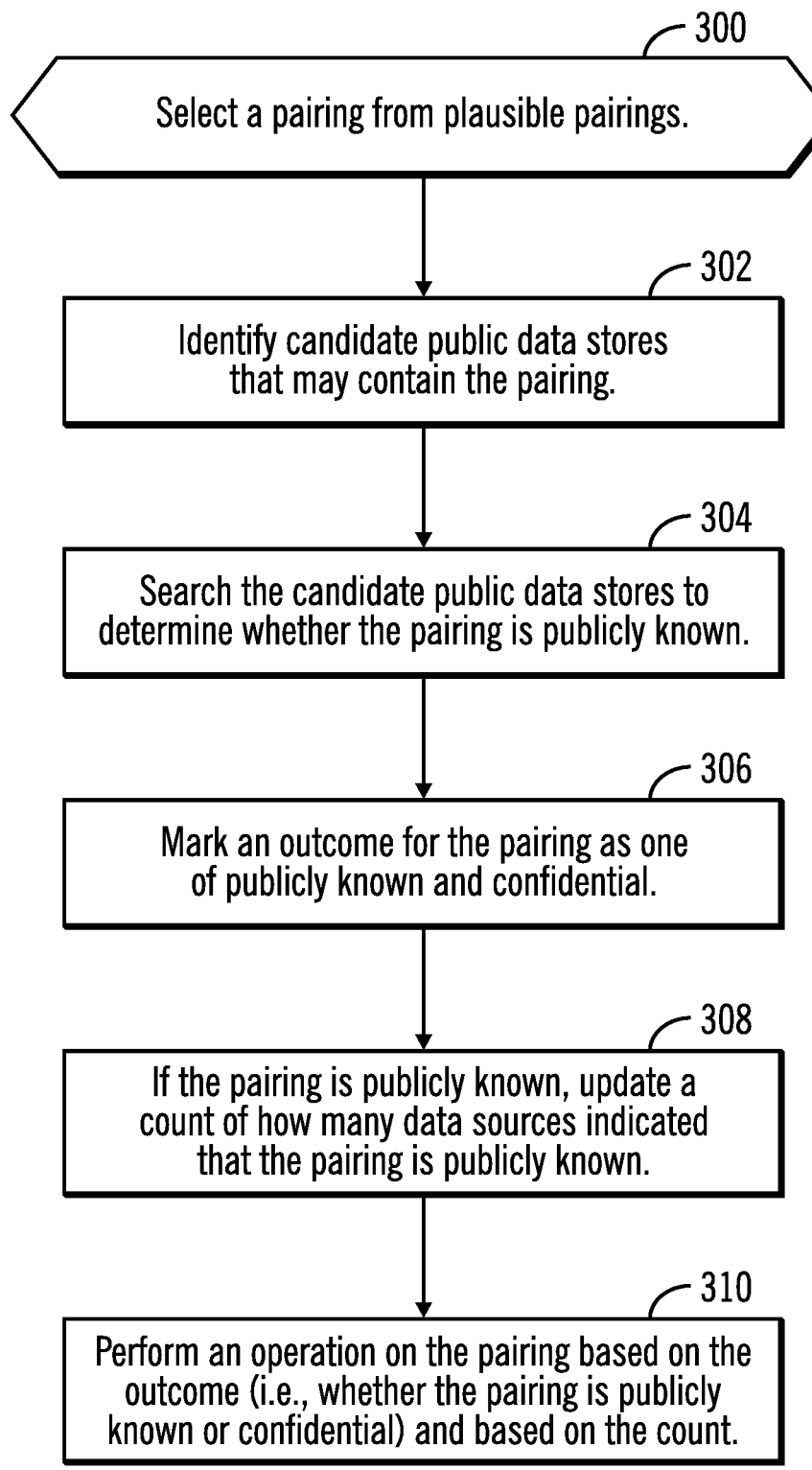
FIG. 3 illustrates, in a flow chart, processing for determining whether a pairing is publicly known in accordance with certain embodiments.

FIG. 3 illustrates, in a flow chart, processing for determining whether a pairing is publicly known in accordance with certain embodiments. Control begins at block 300 with the DEPP system 110 selecting a pairing from the plausible pairings. In certain embodiments, this selection selects two fields of a record. In certain embodiments, the selection includes atomic fields (e.g., a pairing of ("123", "Main Street") or sets (e.g., a pairing of "Mark Smith", "123 Main Street"). In certain embodiments, the selection is performed via deterministic rules, machine leaning, expert systems, etc. In certain embodiments, the selection is performed when a threshold is met (e.g., record age or number of times the pairing has been observed (e.g., only if the pairing has been seen across >3 different data owners or documents).

In block 302, the DEPP system 110 identifies candidate data stores that may contain the pairing. For example, a lookup table may be used to identify candidate sources (e.g., names&numbers.com contains name, address, and phone numbers). This lookup table can be manually constructed, machine constructed, or constructed by combination or other techniques. Embodiments provide auto-discovery of candidate data stores.

In block 304, the DEPP system 110 searches the candidate public data stores to determine whether the pairing is publicly known. In certain embodiments, pairings include an exact match or a fuzzy match. Fuzzy matching may be described as matching two values approximately (e.g., due to spelling mistakes or abbreviations of terms). Thus, fuzzy match may be described as an inexact match or a close match. For example, a pairing of ("Mark Smith", 123 Main St.) may be considered a fuzzy match with a pairing of ("Mark Smith", 123 Main Street).

In block 306, the DEPP system 110 marks an outcome of the pairing search. For example, the outcome may be: publicly known, known but protected (e.g., a pairing only found inside a subscription-only data aggregator, such as a legal data source or a news source, or otherwise confidential), not found etc. Then, in the future, considering the pairing search outcome when making decisions about the pairing (or document) e.g., whether to destroy one's recording of the document or pairing actually destroy the pairing. Certain embodiments perform the marking by setting a flag. In alternative embodiments, the marking is performed by creating a transaction ID that points to a ledger of the evidence used to make the marking assertion (i.e., a list of attributed references showing where the pairs were found and when).

In block 308, if the pairing is publicly known, the DEPP system 110 updates a count of how many data stores indicated that the pairing is publicly known. In certain embodiments, the count is a field or array in a record for the pairing.

In block 310, the DEPP system 110 performs an operation on the pairing based on the outcome (i.e., whether the pairing is publicly known or not) and based on the count. With embodiments, each pairing is associated with a frequency of how many data stores indicated that the pairing is publicly known. For example, the operation may include marking the pairing with the frequency (e.g., denoting a singularly known pairing, a mildly known pairing, a very known pairing, and a widely known pairing depending on how often that pairing was found in the public data stores). As another example, the operation may be to either delete or retain the pairing, based on the count.

In certain embodiments, the DEPP system 110 determines when a pairing is publically available by selecting plausible pairs from a record, selecting public data stores potentially containing such pairs, and using the number of pairs discovered to inform a decision.

The DEPP system 110 uses external data found via the searches to demonstrate or prove that the pairing is a commonly known public pairing. Thus, the DEPP system 110 determines the co-existence of a pairing (e.g., in a document and in a publicly known data store).

Thus, the DEPP system 110 determines whether a pairing from a record is publicly known by searching public data stores, marks the pairing with an outcome of the determining, and performs an operation on the pairing based on the outcome. With embodiments, the pairing is selected from a plurality of pairings based on a threshold, and wherein the threshold is at least one of a record age and a number of times the pairing has been observed. With embodiments, the pairing is a plausible pairing. With embodiments, the DEPP system 110 parses a document to identify a plurality of pairings, wherein each of the pairings comprises two or more fields. With embodiments the record is one of a structured record and an unstructured record. With embodiments, the pairing is determined to be publicly known based on one of an exact match and a fuzzy match. With embodiments, the pairing has an associated frequency.

Figure 4:
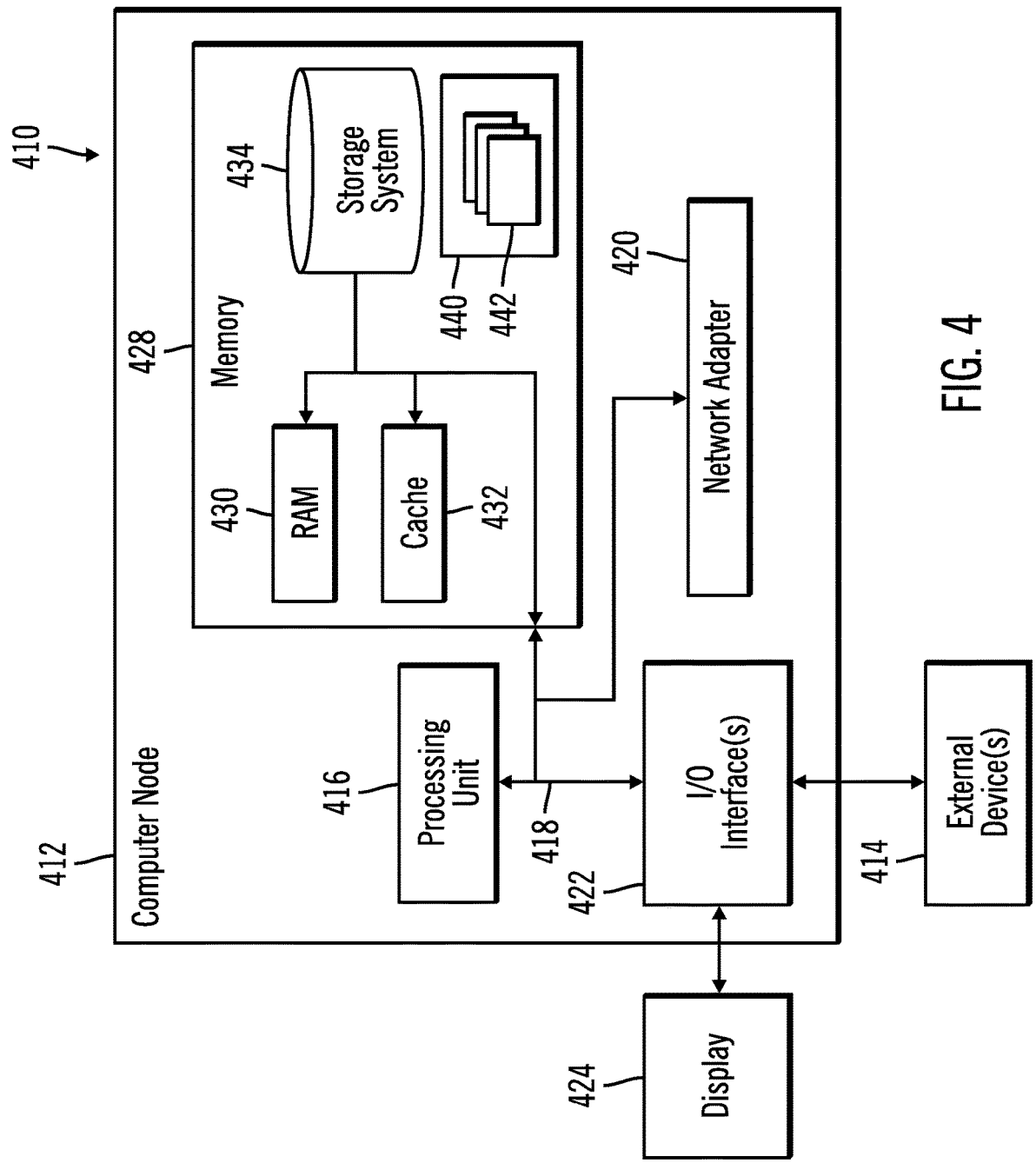
FIG. 4 illustrates a computing node in accordance with certain embodiments.

FIG. 4 illustrates a computing environment 410 in accordance with certain embodiments. In certain embodiments, the computing environment is a cloud computing environment. Referring to FIG. 4, computer node 412 is only one example of a suitable computing node and is not intended to suggest any limitation as to the scope of use or functionality of embodiments of the invention described herein. Regardless, computer node 412 is capable of being implemented and/or performing any of the functionality set forth hereinabove.

The computer node 412 may be a computer system, which is operational with numerous other general purpose or special purpose computing system environments or configurations. Examples of well-known computing systems, environments, and/or configurations that may be suitable for use with computer node 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 412 may be described in the general context of computer system executable instructions, such as program modules, being executed by a computer system. Generally, program modules may include routines, programs, objects, components, logic, data structures, and so on that perform particular tasks or implement particular abstract data types. Computer node 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer node 412 in cloud computing node 410 is shown in the form of a general-purpose computing device. The components of computer node 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 412 typically includes a variety of computer system readable media. Such media may be any available media that is accessible by computer node 412, and it includes both volatile and non-volatile media, removable and non-removable media.

System memory 428 can include computer system readable media in the form of volatile memory, such as random access memory (RAM) 430 and/or cache memory 432. Computer node 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer node 412 may also communicate with one or more external devices 414 such as a keyboard, a pointing device, a display 424, etc.; one or more devices that enable a user to interact with computer node 412; and/or any devices (e.g., network card, modem, etc.) that enable computer node 412 to communicate with one or more other computing devices. Such communication can occur via Input/Output (I/O) interfaces 422. Still yet, computer node 412 can communicate with one or more networks such as a local area network (LAN), a general wide area network (WAN), and/or a public network (e.g., the Internet) via network adapter 420. As depicted, network adapter 420 communicates with the other components of computer node 412 via bus 418. It should be understood that although not shown, other hardware and/or software components could be used in conjunction with computer node 412. Examples, include, but are not limited to: microcode, device drivers, redundant processing units, external disk drive arrays, RAID systems, tape drives, and data archival storage systems, etc.

In certain embodiments, the computing device 100 has the architecture of computer node 412. In certain embodiments, the computing device 100 is part of a cloud environment. In certain alternative embodiments, the computing device 100 is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
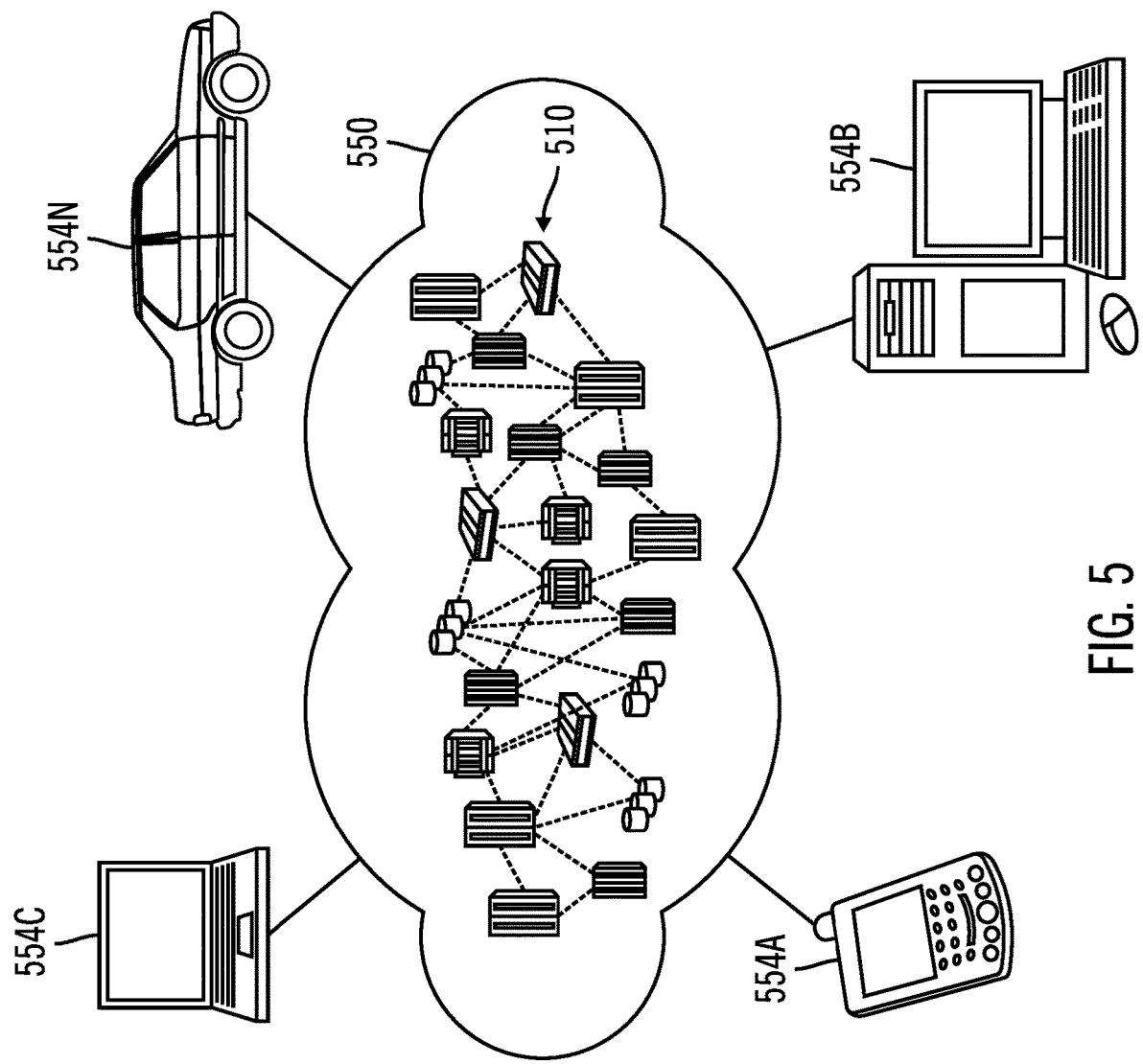
FIG. 5 illustrates a cloud computing environment in accordance with certain embodiments.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and determining existence of plausible pairings 696.

Thus, in certain embodiments, software or a program, implementing determining existence of plausible pairings in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising operations for:
   parsing a document to identify a plurality of pairings;
   selecting a pairing from the plurality of pairings based on a threshold, wherein the threshold is one of an elapsed time and distinct occurrences of the pairing;
   determining a number of public data stores in which the pairing is found, wherein the number comprises a frequency;
   in response to the number having a first frequency, retaining the pairing; and
   in response to the number having a second frequency, deleting the pairing.

2. The method of claim 1, wherein the pairing is stored in a record, and wherein the elapsed time is a record age.

3. The method of claim 2, wherein the record includes a data source, an attribution, and a date and time.

4. The method of claim 1, further comprising operations for:
   storing each identified pairing of the plurality of pairings in a record.

5. The method of claim 4, wherein each record is one of a structured record and an unstructured record.

6. The method of claim 1, wherein the pairing is determined to be publicly known based on one of an exact match and a fuzzy match.

7. The method of claim 1, wherein a Software as a Service (SaaS) is configured to perform the operations of the method.

* * * * *